Dec. 13, 1960   H. F. B. ATKINSON   2,964,275
LITTER BAG AND HOLDER
Filed April 11, 1958

INVENTOR.
H. F. BECK ATKINSON
BY
Atty.

United States Patent Office 2,964,275
Patented Dec. 13, 1960

2,964,275

LITTER BAG AND HOLDER

Hollis F. Beck Atkinson, 540 Amarillo Bldg., Amarillo, Tex.

Filed Apr. 11, 1958, Ser. No. 727,971

6 Claims. (Cl. 248—95)

This invention pertains to litter bags for automobiles and more particularly to magnetically holding a bag to an automobile dashboard.

A part of the American way of life today is the automobile trip with the family. If the family includes children, this trip often leads to a car or highway cluttered with candy wrappers, apple cores, orange peelings and other debris. The desirability of carrying a litter bag in the automobile for collection of debris has previously been suggested. However, if the litter bag is lying loose on the floor, it to some extent adds to the clutter.

An object of this invention is to provide a holder and a litter bag for attachment to the dash of an automobile.

Another object of this invention is to provide such a holder which will hold the bag magnetically.

A further object of this invention is to provide such a litter bag holder which is easily attached to the dashboard of the automobile without the possibility of scratching or otherwise marring the interior finish of the automobile.

Still further objects are to achieve the above with a device that is sturdy, simple and reliable, yet inexpensive and easy to manufacture.

The specific nature of the invention as well as other objects, uses and advantages thereof will clearly appear from the following description and from the accompanying drawings in which.

Figure 1:
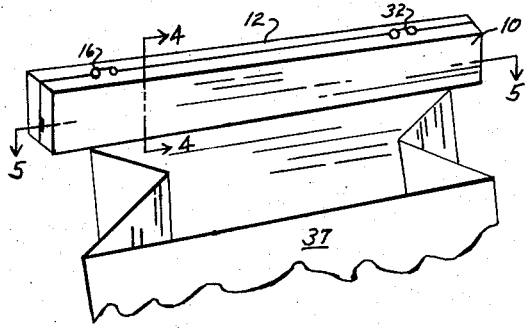
Fig. 1 is a view of the litter bag in the holder.
Figure 2:
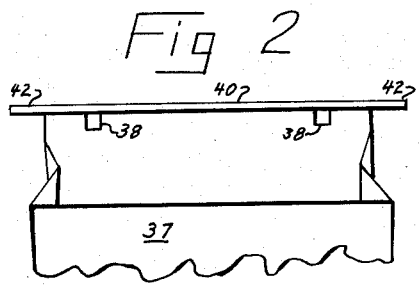
Fig. 2 is a view of the bag.
Figure 4:
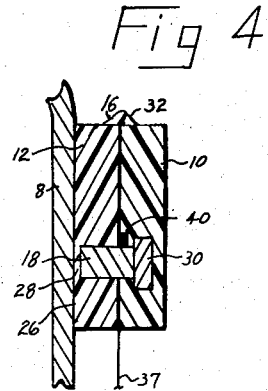
Fig. 4 is a cross section of the holder and bag taken on line 4—4 of Fig. 1.
Figure 3:
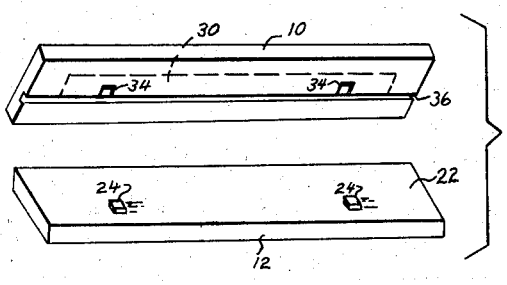
Fig. 3 is a view of the holder in the open position.
Figure 5:
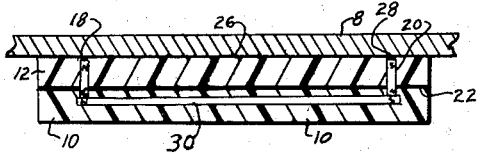
Fig. 5 is a longitudinal section of the holder and bag taken on line 5—5 of Fig. 1.

As may be seen in the accompanying drawings, the holder is adapted to be held on the paramagnetic dash 8 by magnetic force. The force which holds the holder to the dash also holds lid 10 against base 12.

Base 12 is primarily composed of a synthetic plastic material which is molded into a parallelepipedon. Two hinges 16 are along one of the longitudinal edges of the base which is designated as the upper edge of the base. Substantially contained within the base are two base permanent magnets 18 and 20 which extend normal to contacting face 22 of the base. Face 22 is substantially a plane surface and contacts the lid over much of its area. The base magnets protrude through face 22 so that a portion of the magnets form projections 24 beyond the face. On the back face 26 of the base which is opposite contacting face 22, the magnets have a thin film 28 of plastic between them and the surface of face 26. This is a substantially plane surface which fits against the dash 8, and the film prevents the metal of the magnets from scratching the dash.

Lid 10 is also a parallelepipedon constructed of plastic. Contained therein is lid permanent magnet 30 which is basically shaped like a bar and extends lengthwise of the lid and parallel to face 22. The dimensions of the lid are approximately the same as the base so that they fit together to form a parallelepipedon. The lid has hinges 32 at its upper edge which mate with the hinges 16 so that the base and lid are hinged together. Near the ends of lid magnet 30 are indentions 34 in the plastic which mate with the projections 24. The lid magnet is located so that the bottom of these indentions is the magnet near the poles thereof. Base magnets 18 and 20 are reversed so that the north pole of first base magnet 18 is in the projecting portion 24. The lid magnet 30 is oriented so that its south pole is adjacent to indention 34 which contains the north pole of first base magnet 18. Therefore, the north pole of the lid magnet 30 is adjacent to the indention which contains the south pole of second base magnet 20. When the lid is closed, and the holder placed against the dashboard of the automobile, there is one continuous magnetic circuit. The primary holding effect of the holder to the dashboard is by lid magnet 30 which also holds the lid closed against the base.

Immediately above the indention 34, there is a groove 36 in the lid extending parallel to the longest dimension thereof for a purpose which will be described later.

For the litter bag 37 itself, an ordinary paper (kraft) bag may be used. However, it is preferable to use a special bag with a special lining within it. The special lining prevents the dampness of the apple cores and other rubbish from softening the paper. Disposable bags with such linings are well known to the art. Also, the bag has two perforations 38 in an upward extending flap which is adjacent the opening of the bag. These perforations mate the projections 24. Immediately above these perforations in the flap is a ductile, paramagnetic strip 40 extending along the edge of the flap. This strip has two purposes. One, after the bag has been used and contains various debris found in the automobile, it may be removed from the holder and the top rolled down over the bag. Ends 42 which extend beyond the end of the flap may be folded back along the roll to effectively seal it. Also, this strip fits within the groove 36 when the bag is in the holder and thereby helps retain the bag in place by both magnetic force from the magnet 30 and mechanical force by having a projecting strip within the groove.

Normally the holder is removed from the dashboard to insert a new sack. The lid is opened from the base on the hinges, a new sack inserted with the strip fitting within the groove, and then the lid and base closed so that projections 24 pass through perforations 38 and into indentions 34. Then the holder is placed upon the dash and held there by the magnetic forces.

It will be apparent that the embodiment shown is only exemplary and that various modifications can be made in the construction, materials and arrangements within the scope of the invention as defined in the appended claims.

I claim as my invention:

1. A litter bag and magnetic holder therefor adapted to be attached to a paramagnetic object comprising: a disposable bag, a flap on the bag adjacent the opening of the bag, a strip of ductile material attached at the edge of the flap, the strip extending beyond the ends of the flap, perforations through the flap adjacent the strip, said holder having projections which extend through said perforations, and a permanent magnet, said projections being a portion of a complete magnetic circuit consisting of one projection, next the permanent magnet, next another projection, next the paramagnetic object to which the holder is attached, and then the first projection thus completing the circuit.

2. A holder for attaching a litter bag to a paramagnetic dashboard comprising: a base, a lid facing and contacting said base, the contacting face of the base being substantially a plain surface, two permanent magnets substantially in said base normal to said contacting face, one of said magnets having a north pole projecting beyond the contacting face and the second magnet having a south pole projecting beyond said contacting face, a permanent magnet contained within said lid, and the lid having indentations which interfit with said projecting poles whereby a bag may be securely clamped between the base and lid.

3. A holder for attaching a litter bag to a paramagnetic dashboard comprising: a base, a lid facing and contacting said base, the contacting face of the base being substantially a plain surface, two permanent magnets substantially in said base normal to said contacting face, one of said magnets having a north pole projecting beyond the contacting face and the second magnet having a south pole projecting beyond said contacting face, a permanent magnet contained within said lid, and the lid having indentations which interfit with said projecting poles whereby a bag may be securely clamped between the base and lid, wherein said permanent magnet in the lid extends parallel to said contacting face and has a south pole adjacent to the north pole of the first magnet and the magnet in the lid has a north pole adjacent the south pole of the second magnet, the bottom of said indentation being the magnet in the lid.

4. A holder for attaching a litter bag to a paramagnetic dashboard comprising: a base, a lid facing and contacting said base, the contacting face of the base being substantially a plain surface, two permanent magnets substantially in said base normal to said contacting face, one of said magnets having a north pole projecting beyond the contacting face and the second magnet having a south pole projecting beyond said contacting face, a permanent magnet contained within said lid, and the lid having indentations which interfit with said projecting poles whereby a bag may be securely clamped between the base and lid, wherein the backface of the base opposite said contacting face is substantially a plain surface, said magnets in the base terminating short of said back face whereby when the base is placed against the dashboard there is a film between the magnets in the base and the dashboard.

5. A holder for attaching a litter bag to a paramagnetic dashboard comprising: a base, a permanent magnet substantially contained within said base, a lid facing and contacting said base, a permanent magnet contained within said lid, indentations and projections on the lid and base which interfit, said lid having a groove in the surface which contacts the base, said groove extending parallel to the longest dimension of said lid, said groove being adjacent to said projections and indentations whereby a bag may be securely clamped between the base and lid.

6. A holder for attaching a litter bag to a paramagnetic dashboard comprising: a base, two permanent magnets substantially in said base, said base having a back face which is substantially a plain surface, each of said permanent magnets normal to said back face, said magnets terminating short of said back face whereby when the base is placed against the dashboard there is a film between the base magnets and the dashboard, said magnets having poles which project past the face of the base which is opposite the back face, and an element adjacent the projecting poles from the two magnets so that there is a magnetic circuit complete from the dashboard through one magnet through the element through the other magnet and back to the dashboard.

References Cited in the file of this patent

UNITED STATES PATENTS

| | | |
|---|---|---|
| 1,919,819 | Williams | July 25, 1933 |
| 2,078,438 | Baxter | Apr. 27, 1937 |
| 2,100,235 | Brown | Nov. 23, 1937 |
| 2,557,399 | Teetor | June 19, 1951 |